United States Patent [19]

Ostlinning et al.

[11] Patent Number: 4,824,933
[45] Date of Patent: Apr. 25, 1989

[54] PROCESS FOR THE PREPARATION OF COPOLYARYLENE SULPHIDES WITH REDUCED CRYSTALLIZATION TEMPERATURE

[75] Inventors: Edgar Ostlinning, Duesseldorf; Ernst-Ulrich Dorf, Krefeld, both of Fed. Rep. of Germany

[73] Assignee: Bayer Aktiengesellschaft, Leverkusen, Fed. Rep. of Germany

[21] Appl. No.: 113,656

[22] Filed: Oct. 28, 1987

[30] Foreign Application Priority Data

Nov. 6, 1986 [DE] Fed. Rep. of Germany ....... 3637813

[51] Int. Cl.$^4$ ............................................. C08G 75/14
[52] U.S. Cl. .................................... 528/388; 528/226; 528/321; 528/322
[58] Field of Search ................ 528/388, 321, 322, 226

[56] References Cited

U.S. PATENT DOCUMENTS

| | | | |
|---|---|---|---|
| 3,869,434 | 3/1975 | Campbell et al. | 528/388 |
| 4,482,683 | 11/1984 | Quella et al. | 528/388 |
| 4,490,522 | 12/1984 | Kawabata et al. | 528/388 |
| 4,585,856 | 4/1986 | Ebert et al. | 528/388 |
| 4,699,975 | 10/1987 | Katto et al. | 528/388 |

FOREIGN PATENT DOCUMENTS 0215312 3/1987 European Pat. Off. ............ 528/388

*Primary Examiner*—Harold D. Anderson
*Attorney, Agent, or Firm*—Connolly and Hutz

[57] ABSTRACT

This invention relates to a process for the preparation of polyarylene sulphides with reduced crystallization temperature.

3 Claims, No Drawings

PROCESS FOR THE PREPARATION OF COPOLYARYLENE SULPHIDES WITH REDUCED CRYSTALLIZATION TEMPERATURE

This invention relates to a process for the preparation of polyarylene sulphides with reduced crystallisation temperature. Polyarylene sulphides and methods for their preparation are known (e.g. U.S. Pat. No. 2,513,188).

Polyarylene sulphides are partially crystalline polymers which can be processed thermoplastically and have a high dimensional stability under heat. They are also very resistant to chemicals.

Delayed onset of crystallisation of the molten polymer is advantageous for certain purposes, for example when premature solidification of the flow front of the molten polymer is to be avoided when the polymer is being injection moulded into complicated molds.

The present invention therefore relates to a process for the preparation of highly crystalline, optionally branched polyarylene sulphides with reduced crystallisation temperature, by the reaction of (a) 75–99.5 mol-% of dihalogenated aromatic compounds corresponding to the formula

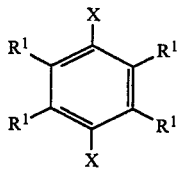

wherein

X denotes halogen atoms such as chlorine or bromine in the para-position to one another and the $R^1$s may be identical or different and denote hydrogen, $C_1$–$C_4$-alkyl, $C_5$–$C_{10}$-cycloalkyl, $C_6$–$C_{10}$-aryl, $C_7$–$C_{14}$-alkylaryl or $C_7$–$C_{14}$-arylalkyl, where any two $R^1$s which are in the orthoposition to one another, together with the carbon atoms in a ring to which they are attached, may be linked together to form an aromatic or heterocyclic ring having 5 or 6 ring atoms, and up to 3 ring carbon atoms may be replaced by O, S or N, (b) from 0 to 5 mol-%, preferably from 0 to 1.25 mol-%, based on the dihalogenated aromatic compounds of formula I, of a tri- or tetra-halogenated aromatic compound corresponding to the formula $$ArX_n \qquad (II)$$

wherein

Ar denotes an aromatic group having 6 to 14 carbon atoms or a heterocyclic group having 6 to 14 carbon atoms and up to 4 ring carbon atoms may be replaced by hetero atoms such as N, O or S, X denotes halogen such as chlorine or bromine and n represents the number 3 or 4, (c) conventional chain terminating agents, (d) alkali metal sulphides, preferably sodium or potassium sulphide or mixtures thereof, together with alkali metal hydrogen sulphides, preferably sodium or potassium hydrogen sulphide or mixtures thereof, in the form of their hydrates or aqueous mixtures, optionally together with catalysts or other auxiliary agents in a solvent, and (e) from 0.5 to 25 mol-%, preferably from 0.5 to 10, most preferably from 1 to 7.5 mol-% of a comonomer or a mixture of different comonomers at a pressure of from 1 to 50 bar, characterised in that the comonomers are selected from 3,4-dichlorodiphenylsulphone, 3,4-dichlorobenzophenone, N-(3,4-dichlorophenyl)-phthalimide, 4,4'-dichlorotriphenylamine, N-phenyl-4,5-dichlorophthalimide, N-(3,4-dichlorophenyl)-hexahydrophthalimide, 2,4-dichloro-6-phenyltriazine-(1,3,5), 2,3-dichloroquinoxaline, 2,3-dichloro-6-methyl-quinoxaline, N-(3,4-dichlorophenyl)-3,4-diphenyldicarboxylimide and/or 2,6-dichlorobenzothiazole.

The following are examples of dihalogenated aromatic compounds of formula (I) to be used according to the invention: 1,4-Dichlorobenzene, 1,4-dibromobenzene, 1-bromo-4-chlorobenzene, 2,5-dichlorotoluene, 2,5-dichloroxylene, 1,4-dichloro-2-ethylbenzene, 1,4-dibromo-2-ethylbenzene, 1-bromo-4-chloroethylbenzene, 1,4-dichloro-2,3,5,6-tetramethylbenzene, 1,4-dichloro-2-cyclohexylbenzene, 1,4-dichloro-2-hexylbenzene, 2,5-dichlorodiphenyl, 2-benzyl-1,4-dichlorobenzene, 2,5-dibromodiphenyl, 2,5-dichloro-4'-methyldiphenyl, and 2,4-dibromo-4'-methyl-diphenyl. They may be used separately or as mixtures with one another. 1,4-Dichlorobenzene and/or 1,4-dibromobenzene are particularly preferred.

Polar organic solvents may suitably be used, e.g. lactams such as N-alkyllactam, for example, N-methylpyrrolidone, N-ethylpyrrolidone, N-isopropylpyrrolidone, N-methylpiperidone, N-methylcaprolactam, N-ethylcaprolactam, N,N'-dimethylimidazolidinone and 1-methyl-1-oxophospholan or mixtures thereof.

The boiling point of the solvent should be from 200° to 350° C.

The usual chain terminating agents may be used:

(1) aromatic monohalogen compounds, e.g. chlorobenzene, bromobenzene, 4-chlorotoluene, 4-bromotoluene, 4-chlorobiphenyl, 4-chlorodiphenylsulphone, etc., (2) phenols, e.g. phenol, para-cresol, ortho-cresol, m-cresol, etc., (3) thiophenol, e.g. thiophenol, n-methylthiophenol, 3-methylthiophenol, 4-mercaptobiphenyl, etc.

Alkali metal fluorides, alkali metal sulphates, alkali metal phosphonates, alkali metal sulphites, alkali metal acetates, etc. may be used as catalysts.

The reaction may be carried out by various methods:

The alkali metal sulphides and/or alkali metal hydrogen sulphides are preferably used in the form of their hydrates and aqueous mixtures or aqueous solutions. The reaction mixture is partially or, preferably, completely dehydrated. Anhydrous sulphides may also be used. The water present in the reaction mixture may be distilled off either directly or with the aid of substances which form azeotropic mixtures with water, preferably the dihalogenated aromatic compounds of formula (I). For dehydration, all the reactants may be mixed together and the whole mixture may then be dehydrated. Alternatively, the alkali metal sulphide and/or alkali metal hydrogen sulphide may be dehydrated separately with a portion of the reactants or on its own.

In one embodiment of the reaction, the reactants are continuously brought together in the presence of the polar solvent, optionally together with a reaction accelerator or a mixture of reaction accelerators, and water is removed at the same time. With this procedure, any reaction setting in may be controlled by the rate at which the reactants are introduced. The procedure also allows the prolonged presence of water in the system to be avoided.

If the reaction mixture is completely dehydrated, the reaction may be carried out pressure-free down to a pressure of about 10 bar, preferably 3 bar. Higher pressures, up to 50 bar, may be employed for the purpose of obtaining higher reaction temperatures, above the boiling point of the solvent or of the mixture of solvent and dihalogenated and polyhalogenated aromatic compounds.

The reaction may be carried out continuously or discontinuously. The reaction time may vary over a wide range. It may extend over 1 to 48 hours, preferably 1 to 18 hours. The reaction temperatures range from 150° C. to 300° C., preferably from 170° C. to 280° C.

The comonomers and chain terminating agents may be added before or during the process of dehydration or after dehydration has been completed. These substances may be added portionwise at certain times during the reaction over a certain period of time, e.g. within the first three hours of the reaction, or the total calculated quantity may be added directly at a specified time during the reaction.

Working up of the reaction mixture and isolation of the polyarylene sulphides may be carried out in known manner.

The polyarylene sulphide may be separated from the reaction solution by the usual procedures, for example by filtration or centrifuging, either directly or, for example, after the addition of water and/or dilute acids. After the polyarylene sulphide has been separated, it is generally washed with water although washing or extraction with other washing liquids may also be carried out in addition or subsequently to this washing with water.

The polyarylene sulphide may also be obtained by, for example, removal of the solvent by distillation followed by the process of washing described above.

The polyarylene sulphide may also be precipitated by its introduction into organic solvents, for example into alcohols such as ethanol, methanol, 1-propanol or 2-propanol or into ketones such as acetone or methyl ethyl ketone, and may then be freed from impurities.

Work up of the product may be carried out continuously or batchwise.

The polyarylene sulphides prepared by the process according to the invention are distinguished by the fact that their crystallisation sets in at a lower temperature (about 150° to 250° C.) although their crystallinity is substantially the same and their melting characteristics virtually unchanged. These polyarylene sulphides are therefore more easily manufactured, for example into foils and films, fibres and injection moulded parts with long flow lengths or small cross-sections.

The polyarylene sulphides prepared according to the invention may be mixed with other polymers and with pigments and fillers such as graphite, metal powders, glass powder, quartz powder, fused quartz, glass fibres and carbon fibres or with mould release agents or stabilisers conventionally used for polyarylene sulphides.

The melt flow properties of the polyarylene sulphides are generally determined according to ASTM 1238-70 at 316° C. using a 5 kg weight and given in terms of g/10 min.

If the melt flow values are high, however, this method of measurement may give rise to difficulties owing to the high outflow rate of the polymer melt.

The melt viscosity $n_m$ of the polymer melt (in Pa.s) in dependence upon the shearing strain (in Pa) at 306° C. was therefore determined by means of an Instron Rotation viscosimeter.

This enables the melt viscosity to be determined over a very wide range of from $10^1$ to $10^7$ Pa.s. In the Instron Rheometer, the polymer is melted between a fixed plate and a rotatable cone and the torque of the cone is determined. The melt viscosity in dependence on the shearing strain can be calculated from the torque, the angular velocity and the constants of the apparatus. The Rheometer Model 3250 of Instron was used.

The value given for the melt viscosity was that which was determined at a shearing strain of $\tau = 10^2$ Pa.

The melting and crystallisation points [°C.] were determined by DSC (="differential scanning calorimetry") on a commercially available measuring apparatus at heating and cooling rates of 20 k/min.

The polyarylene sulphides according to the invention generally have melt viscosities of from $0.1 \times 10^1$ to $5 \times 10^4$ Pa.s, preferably from $0.1 \times 10^1$ to $1.5 \times 10^3$ Pa.s immediately after their isolation from the reaction mixture. They can be directly manufactured into films, fibres or moulded bodies by extrusion, extrusion blowing, injection moulding or other conventional processing techniques. These products may be employed for the conventional purposes, e.g. as motor vehicle parts, mountings and fittings and parts of electrical equipment, e.g. switches, electronic panels and electronic parts, chemically resistant and weathering resistant parts and apparatus such as pump housings and pump impellors, etching batch containers, sealing rings, parts of office machinery and telecommunication equipment, domestic appliances, etc.

EXAMPLE 1

Comparison example 2693.0 g of N-methylcaprolactam, 608.7 g of 1,4-dichlorobenzene and 27.3 g of phenol are introduced into a 5-liter reaction vessel equipped with a thermometer, stirrer, coolable column, distillate divider, reflux condenser and two dropping funnels and heated to reflux. A solution of 1147.5 g of sodium sulphide hydrate, 4.4 g of sodium hydroxide and 141.1 g of caprolactam is added dropwise at such a rate that the water can distil off azeotropically with the 1,4-dichlorobenzene. At the same time, a further 608.7 g of 1,4-dichlorobenzene are continuously added to the reaction mixture. The 1,4-dichlorobenzene distilled off is returned to the reaction mixture after removal of the water in order to maintain the stoichiometric proportions. When all the components have been added and dehydration has been completed, the column is adjusted to reflux, the reaction mixture is heated under reflux for a further 10 hours and the product is finally isolated in the conventional manner (for values of DSC measurements see Table).

EXAMPLE 2

The same as Example 1 but without phenol. Furthermore, only 566.1 g of 1,4-dichlorobenzene are introduced into the reaction vessel. In addition, 47.7 g of 3,4-dichlorodiphenylsulphone and 63.0 g of 4-chlorodiphenylsulphone are introduced.

EXAMPLE 3

The same as Example 2 but using 35.1 g of phenol instead of 4-chloro-diphenylsulphone.

EXAMPLE 4

The same as Example 3 but with the addition of 48.5 g of N-(3,4-dichlorophenyl)-phthalimide after dehydration instead of 3,4-dichlorodiphenylsulphone.

EXAMPLE 5

The same as Example 1 but without phenol and with the addition of 52.0 g of 4,4'-dichlorotriphenylamine. In addition, 584.4 g of 1,4-dichlorobenzene were introduced.

EXAMPLE 6

The same as Example 5 but with the introduction of 41.9 g of 2,6-dichloro-benzothiazole into the reaction vessel instead of 4,4'-dichlorotriphenylamine.

EXAMPLE 7

The same as Example 5 but with 37.5 g of 2,4-dichloro-6-phenyl-triazine instead of 4,4'-dichlorotriphenylamine.

EXAMPLE 8

The same as Example 5 but with 35.3 g of 2,3-dichloro-6-methyl-quinoxaline instead of 4,4'-dichlorotriphenylamine.

Table 1 below shows the melting points (Tm) determined by DSC measurement and the crystallization points (Tk) appearing in the cooling curve, all measured at a rate of 20 K/min.

TABLE 1

| Example | Tm [°C.] | Tk [°C.] |
| --- | --- | --- |
| 1 | 285.2 | 234.7 |
| 2 | 278.8 | 192.2 |
| 3 | 281.0 | 209.0 |
| 4 | 269.8 | 187.1 |
| 5 | 270.7 | 208.2 |
| 6 | 268.4 | 201.1 |
| 7 | 281.3 | 192.0 |
| 8 | 281.9 | 200.5 |

We claim:

1. Process for the preparation of highly crystalline branched or unbranched polyarylene sulphides with reduced crystallization temperature, which comprises reacting:

(a) from 75–99.5 mol-% of at least one dihalogenated aromatic compound corresponding to the formula

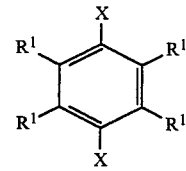

wherein

X represents halogen in the para-position to one another and the $R^1$s which are identical or different represent hydrogen, $C_1$–$C_4$-alkyl, $C_5$–$C_{10}$-cycloalkyl, $C_6$–$C_{10}$-aryl, $C_7$–$C_{14}$-alkylaryl or $C_7$–$C_{14}$-arylalkyl or any two groups represented by $R^1$ which are in the orthoposition to one another, together with the carbon atoms in the ring to which they are attached, are linked together to form an aromatic or heterocyclic ring having 5 or 6 ring atoms, with up to 3 ring carbon atoms replaced by O, S or N, (b) from 0 to 5 mol-%, based on the dihalogenated aromatic compound of formula (I), of a tri- or tetrahalogenated aromatic compound of the formula $$ArX_n \qquad (II)$$

wherein

Ar represents an aromatic group having 6 to 14 carbon atoms or a heterocyclic group having 6 to 14 carbon atoms with up to 4 ring carbon atoms replaced by N, O or S, X represents halogen and n represents the number 3 or 4, (c) conventional chain terminating agents, (d) alkali metal sulphides together with alkali metal hydrogen sulphides in the form of their hydrates or aqueous mixtures, with or without catalysts or other auxiliary agents, in a solvent, and (e) from 0.5 to 24 mol-% of a comonomer or of a mixture of various comonomers, at a pressure of from 1 to 50 bar, wherein the comonomers are 3,4-dichlorodiphenylsulphone, 3,4-dichlorobenzophenone, N-(3,4-dichlorophenyl)-phthalimide, 4,4-dichloro-triphenylamine, N-phenyl-4,5-dichlorophthalimide, N-(3,4-dichlorophenyl)-hexahydrophthalimide, 2,4-dichloro-6-phenyl-triazine-(1,3,5), 2,3-dichloroquinoxaline, 2,3-dichloro-6-methyl-quinoxaline, N-(3,4-dichlorophenyl)-3,4-diphenyldicarboxylimide or 2,6-dichlorobenzothiazole.

2. Process according to claim 1 wherein the dihalogenated aromatic compound of formula (I) is 1,4-dichlorobenzene.

3. Process according to claim 1 wherein solvent is a lactam.

* * * * *